(12) United States Patent
Masuda

(10) Patent No.: US 10,759,223 B2
(45) Date of Patent: Sep. 1, 2020

(54) AXLE HOUSING SUPPORTING STRUCTURE

(71) Applicant: KABUSHIKI KAISHA TOYOTA JIDOSHOKKI, Kariya-shi, Aichi-ken (JP)

(72) Inventor: Hideo Masuda, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 63 days.

(21) Appl. No.: 16/100,374

(22) Filed: Aug. 10, 2018

(65) Prior Publication Data

US 2019/0061422 A1 Feb. 28, 2019

(30) Foreign Application Priority Data

Aug. 24, 2017 (JP) .................................. 2017-161221

(51) Int. Cl.
| | |
|---|---|
| *B60B 35/16* | (2006.01) |
| *B60B 27/00* | (2006.01) |
| *B66F 9/075* | (2006.01) |
| *F16D 65/00* | (2006.01) |
| *F16D 55/00* | (2006.01) |
| *F16D 55/36* | (2006.01) |

(52) U.S. Cl.
CPC ........ *B60B 35/163* (2013.01); *B60B 27/0052* (2013.01); *B66F 9/07509* (2013.01); *B66F 9/07586* (2013.01); *F16D 55/36* (2013.01); *F16D 65/0068* (2013.01); *F16D 2055/0016* (2013.01)

(58) Field of Classification Search
CPC ............... B60B 35/163; B60B 27/0052; B66F 9/07586; F16D 2055/0016; F16D 55/36
See application file for complete search history.

(56) References Cited

U.S. PATENT DOCUMENTS

| | | | |
|---|---|---|---|
| 6,254,196 B1 * | 7/2001 | Gee .......................... | B60B 27/00 |
| | | | 301/105.1 |
| 6,279,695 B1 | 8/2001 | Davison | |
| 7,055,406 B1 | 6/2006 | Kuzuya et al. | |
| 2005/0088037 A1 * | 4/2005 | Beutler ................. | B60B 35/121 |
| | | | 301/124.1 |
| 2013/0062928 A1 * | 3/2013 | Crawford ................ | B60T 1/065 |
| | | | 301/105.1 |

(Continued)

FOREIGN PATENT DOCUMENTS

| | | | |
|---|---|---|---|
| DE | 2923157 A1 * | 12/1979 | ............. F16D 55/40 |
| DE | 102012208921 A1 * | 12/2013 | ............. F16D 55/40 |

(Continued)

OTHER PUBLICATIONS

Machine Translation of DE102012208921 (Year: 2013).*

*Primary Examiner* — Paul N Dickson
*Assistant Examiner* — Kurtis Nielson
(74) *Attorney, Agent, or Firm* — Sughrue Mion, PLLC

(57) ABSTRACT

An axle housing supporting structure includes an axle housing, a brake housing, an axle bracket for supporting the axle housing and the brake housing, a connecting member inserted in the axle housing and the axle bracket to connect the axle housing and the axle bracket for preventing the axle housing from falling from the axle bracket, and at least one co-fastening bolt fastening the axle bracket, the brake housing, and the axle housing together.

3 Claims, 4 Drawing Sheets

(56) References Cited

U.S. PATENT DOCUMENTS

2017/0120676 A1* 5/2017 Chung ................. B60B 35/125

FOREIGN PATENT DOCUMENTS

| GB | 2122146 | A | * | 1/1984 | ......... B60B 27/0031 |
|----|---------|---|---|--------|------------------------|
| JP | 05-169906 | A | | 7/1993 | |
| JP | 2000-071794 | A | | 3/2000 | |
| JP | 2003-343612 | A | | 12/2003 | |
| JP | 2003343612 | A | * | 12/2003 | |

* cited by examiner

AXLE HOUSING SUPPORTING STRUCTURE

BACKGROUND ART

The present disclosure relates to an axle housing supporting structure.

An industrial vehicle such as a forklift truck includes an axle shaft transmitting drive force to drive wheels, an axle housing accommodating the axle shaft, an axle bracket, and a brake device. The brake device includes a brake and a brake housing accommodating the brake. The axle bracket supports the axle housing and the brake housing. Thus, the axle housing, the brake device, and the axle bracket are assembled into a unit.

Japanese Patent Application Publication No. 2003-343612 discloses a brake device in which an axle housing and a brake housing are fixed to an axle bracket together by co-fastening bolts, so that the axle bracket supports the axle housing.

When the axle housing and the brake housing are fixed to the axle bracket together by the co-fastening bolts, the components need to be fixed by the co-fastening bolts in a state that the components are positioned with each other. When using a jig for positioning the components with each other, the dedicated jig needs to be made. Furthermore, installing and removing the jig takes some time.

The present disclosure is directed to providing an axle housing supporting structure, in which the axle housing and the brake housing can be fixed to the axle bracket together by co-fastening bolts without using any jig.

SUMMARY

In accordance with an aspect of the present disclosure, there is provided an axle housing supporting structure including an axle housing, a brake housing, an axle bracket for supporting the axle housing and the brake housing, a connecting member inserted in the axle housing and the axle bracket to connect the axle housing and the axle bracket for preventing the axle housing from falling from the axle bracket, and at least one co-fastening bolt fastening the axle bracket, the brake housing, and the axle housing together.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure together with objects and advantages thereof, may best be understood by reference to the following description of the presently preferred embodiments together with the accompanying drawings in which.

DETAILED DESCRIPTION OF THE EMBODIMENTS

Figure 1:
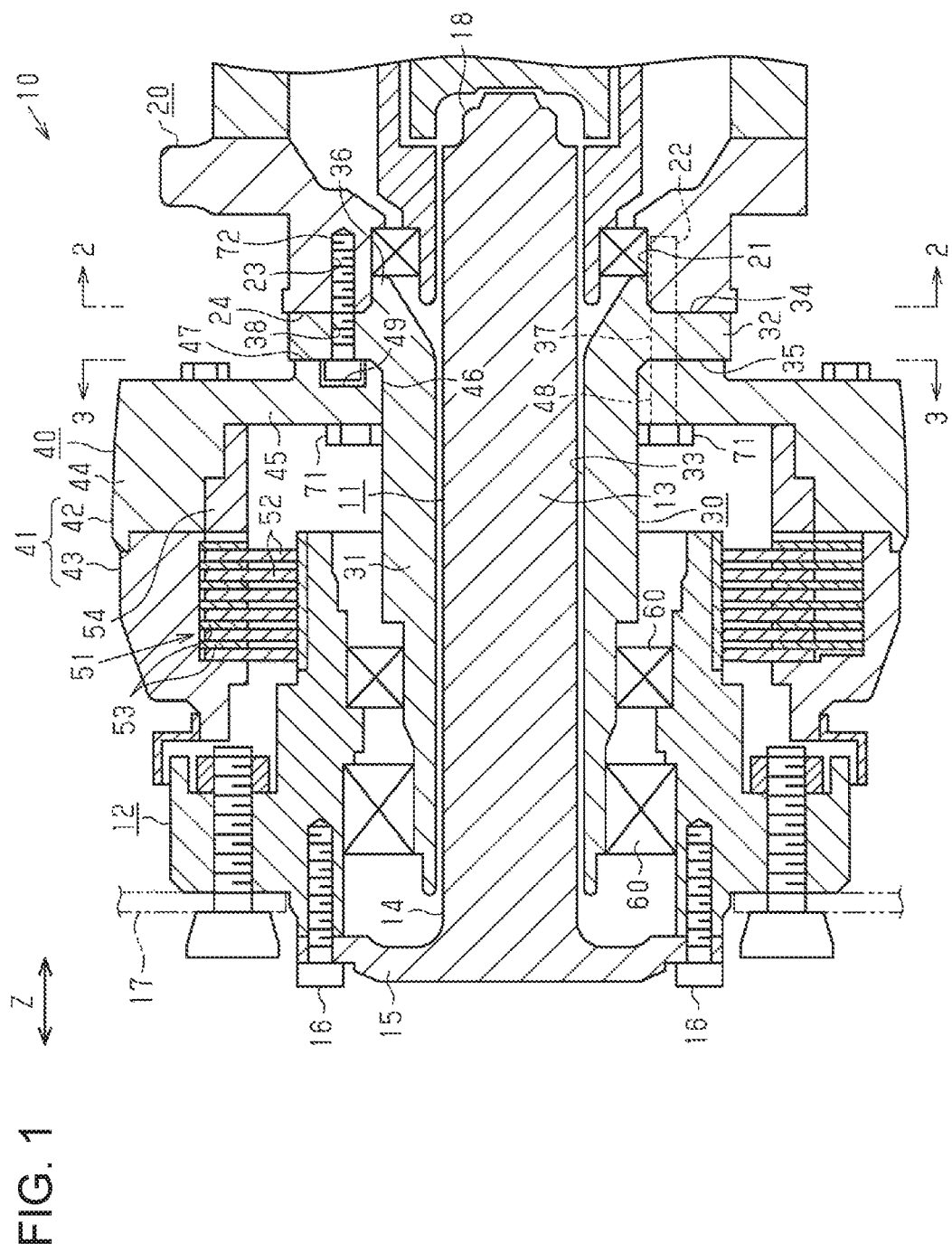
FIG. 1 is a sectional view of a front axle according to an embodiment of the present disclosure.

The following will describe an axle housing supporting structure according to an embodiment of the present disclosure. Referring to FIG. 1, a front axle 10 includes an axle shaft 11, an axle bracket 20, an axle housing 30 accommodating the axle shaft 11, a brake device 40, and a hub 12. The front axle 10 is used for an industrial vehicle such as a forklift truck and rotates front wheels as drive wheels.

The axle shaft 11 has a shaft body 13, a first end portion 14 formed at the end of the shaft body 13 in the axial direction of the shaft body 13, or in the direction of the axis Z, and a shaft flange 15 disposed at the first end portion 14 in the direction of the shaft body 13. The front axle 10 includes bolts 16 connecting the shaft flange 15 and the hub 12. A wheel 17 of a front wheel is fixed to the hub 12. The rotation of the axle shaft 11 rotates the hub 12 and the front wheel integrally, so that the industrial vehicle travels.

The axle bracket 20 has a cylindrical shape. The axle bracket 20 is disposed on the side adjacent to a second end portion 18 of the shaft body 13 disposed in the direction of the axis Z. The axle bracket 20 is disposed such that the axial direction of the axle bracket 20 coincides with the axis Z. The axle bracket 20 has a first insertion hole 21 that is formed in a region surrounded by the inner surface of the axle bracket 20 and into which a part of the shaft body 13 is inserted. Although illustration is omitted in the present disclosure, the axle bracket 20 has a mounting portion for being mounted to a body of an industrial vehicle. The front axle 10 is mounted to the vehicle body via the mounting portion.

Figure 2:
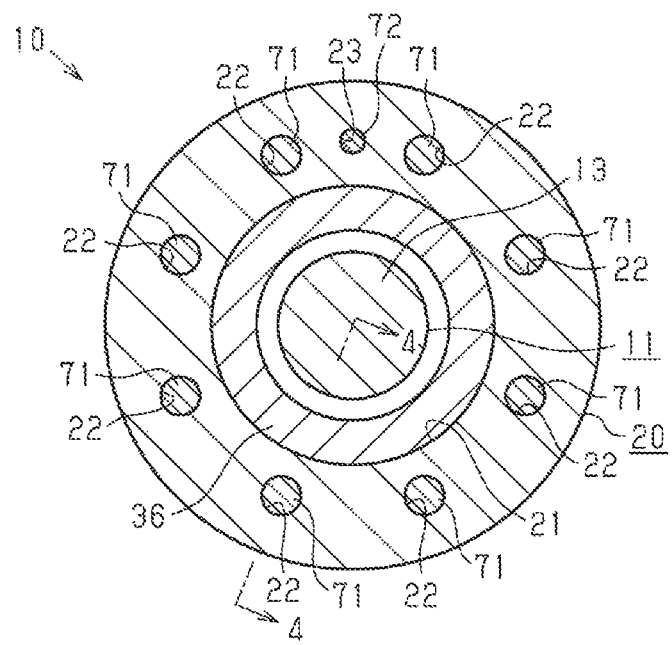
FIG. 2 is a sectional view taken along the line 2-2 of FIG. 1, showing the front axle.
Figure 4:
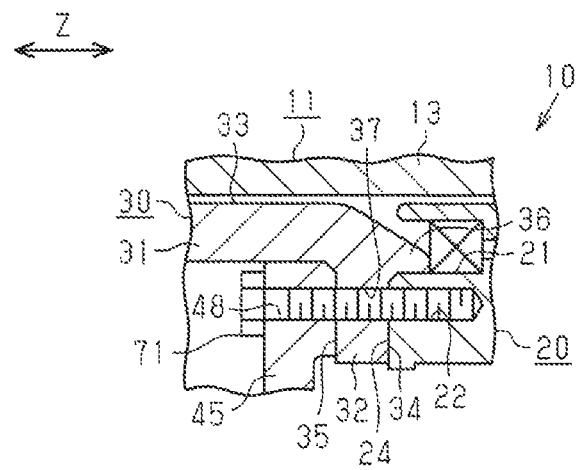
FIG. 4 is a sectional view aken along the line 4-4 of FIG. 2, showing the front axle.

As shown in FIGS. 1, 2, and 4, the axle bracket 20 has eight threaded holes 22 and a retaining threaded hole 23 that extend in the direction of the axis Z. Each threaded hole 22 has the opening on an end surface 24 on the side of the first end portion 14 in the direction of the axis Z. The threaded holes 22 are arranged in the peripheral direction of the axle bracket 20 (axle shaft 11) and are disposed concentric with the axle shaft 11. The threaded holes 22 are spaced at regular angular intervals of 45 degrees. The retaining threaded hole 23 has the opening on the end surface 24. The retaining threaded hole 23 is smaller in diameter than each threaded hole 22.

As shown in FIG. 1, the axle housing 30 has a body 31 of a cylindrical shape and a flange 32 protruding from the outer peripheral surface of the body 31. The axle housing 30 is disposed such that the axial direction of the body 31 coincides with the direction of the axis Z. The axle housing 30 is arranged side by side with the axle bracket 20 in the direction of the axis Z. The axle housing 30 is disposed on the side more adjacent to the first end portion 14 than the axle bracket 20. The flange 32 is disposed facing the end surface 24 of the axle bracket 20.

The axle housing 30 has a second insertion hole 33 that is formed in a region surrounded by the inner peripheral surface of the body 31 and through which the shaft body 13 is inserted. The flange 32 has a first end surface 34 facing the end surface 24 in the direction of the axis Z and a second end surface 35 opposite to the first end surface 34. A projecting portion 36 is formed by a part of the body 31 protruding from the first end surface 34 in the direction of the axis Z. The projecting portion 36 is inserted into the first insertion hole 21 of the axle bracket 20. The outer diameter of the projecting portion 36 is slightly smaller than the inner diameter of the first insertion hole 21 of the axle bracket 20. The projecting portion 36 is fitted in the first insertion hole 21 of the axle bracket 20 and serves as a fitting portion.

As shown in FIGS. 1 and 4, the axle housing 30 has eight first through holes 37 (only one hole shown in the drawing) formed through the flange 32 in the direction of the axis Z and a retaining through hole 38 formed through the flange 32 in the direction of the axis Z. The positional relationship among the first through holes 37 is the same as that among the threaded holes 22. Specifically, the first through holes 37 are arranged in the peripheral direction of the axle housing 30 (axle shaft 11) and are disposed concentric with the axle shaft 11. The first through holes 37 are spaced at regular angular intervals of 45 degrees. The retaining through hole 38 is smaller in diameter than each first through hole 37.

As shown in FIG. 1, the brake device 40 includes a brake housing 41 and a brake 51 accommodated in the brake housing 41. The brake housing 41 has a cylindrical shape so as to cover the axle housing 30 as a whole. The brake housing 41 is disposed such that the axial direction of the brake housing 41 coincides with the direction of the axis Z. The brake housing 41 includes a first housing 42 and a second housing 43. The first housing 42 has a cylindrical portion 44 and a wall portion 45 extending from the cylindrical portion 44 toward the axis center of the cylindrical portion 44. The brake housing 41 has an axle insertion hole 46 that is formed through the wall portion 45 in the direction of the axis Z and through which the axle housing 30 is inserted. The second housing 43 has a cylindrical shape and is connected with the cylindrical portion 44.

Figure 3:
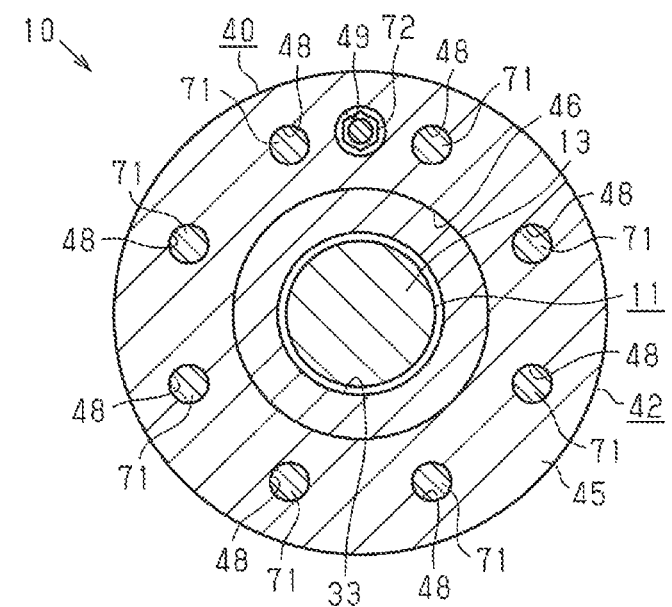
FIG. 3 is a sectional view aken along the line 3-3 of FIG. 1, showing the front axle.

As shown in FIGS. 1, 3, and 4, an outer surface 47 of the wall portion 45 is disposed facing the second end surface 35 of the flange 32. The brake housing 41 has eight second through holes 48 through the wall portion 45 in the direction of the axis Z. The second through holes 48 are disposed so as to surround the axle insertion hole 46. The positional relationship among the second through holes 48 is the same as that among the first through holes 37. Specifically, the second through holes 48 are arranged in the peripheral direction of the brake housing 41 (axle shaft 11) and are disposed concentric with the axle shaft 11. The second through holes 48 are spaced at regular angular intervals of 45 degrees. The brake housing 41 has a recess 49 that is recessed from the outer surface 47 of the wall portion 45 in the direction of the axis Z.

The threaded holes 22, the first through holes 37, and the second through holes 48 are arranged side by side in the direction of the axis Z. The retaining threaded hole 23, the retaining through hole 38, and the recess 49 are arranged side by side in the direction of the axis Z. In the present embodiment, the brake 51 is a wet-type multiple disc brake. The brake 51 includes friction plates 52 fixed to the hub 12, mating plates 53 fixed to the inner peripheral surface of the second housing 43, and a piston 54 accommodated in the first housing 42. The friction plates 52 and the mating plates 53 are alternatively arranged side by side in the direction of the axis Z. The piston 54 is movable in the direction of the axis Z and presses the friction plates 52 and the mating plates 53 or releases the pressure by moving in the direction of the axis Z.

The front axle 10 includes a bearing 60 disposed between the outer peripheral surface of the axle housing 30 and the hub 12. The bearing 60 supports the hub 12 rotatably.

The axle bracket 20 supports the axle housing 30 and the brake housing 41. The front axle 10 includes eight co-fastening bolts 71 and a retaining bolt 72 as a connecting member. The retaining bolt 72 is smaller in diameter than each co-fastening bolt 71.

The retaining bolt 72 is inserted through the retaining through hole 38 toward the retaining threaded hole 23 and screwed into the retaining threaded hole 23. The head of the retaining bolt 72 is accommodated in the recess 49. The retaining bolt 72 is inserted through the axle housing 30 into the axle bracket 20 and screwed into the retaining threaded hole 23 of the axle housing 30, so that the retaining bolt 72 connects the axle housing 30 and the axle bracket 20.

Each co-fastening bolt 71 is inserted through the corresponding second through hole 48 toward the corresponding threaded hole 22 and screwed into the threaded hole 22. The co-fastening bolts 71 fasten the axle bracket 20, the axle housing 30, and the brake housing 41 together. The threaded holes 22, the first through holes 37, and the second through holes 48 are spaced at regular angular intervals, respectively, so that the eight co-fastening bolts 71 are spaced at regular angular intervals. When the above components are spaced at regular angular intervals, subtle dimensional error due to tolerance of each component constituting the front axle 10 is allowable.

As described above, the axle housing supporting structure according to the present embodiment has the axle housing 30, the brake housing 41, the axle bracket 20 for supporting the axle housing 30 and the brake housing 41, the retaining bolt 72 inserted in the axle housing 30 and the axle bracket 20 to connect the axle housing 30 and the axle bracket 20 for preventing the axle housing 30 from falling from the axle bracket 20, and the co-fastening bolts 71 fastening the axle bracket 20, the axle housing 30, and the brake housing 41 together.

Figure 5:
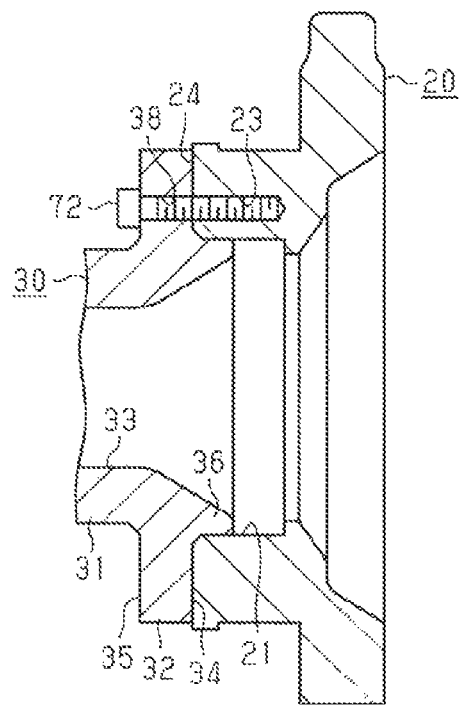
FIG. 5 is a view illustrating a step for assembling an axle housing to an axle bracket.

The following will describe the function of the axle housing supporting structure, according to the present embodiment, explaining the method of assembling the axle housing 30. As shown in FIG. 5, when the axle housing 30 is assembled to the axle bracket 20, the projecting portion 36 of the axle housing 30 is inserted into the first insertion hole 21 of the axle bracket 20. Then, the axle housing 30 and the axle bracket 20 are positioned so as to communicate the retaining threaded hole 23 of the axle bracket 20 and the retaining through hole 38 of the axle housing 30. The axle bracket 20 is set such that the retaining threaded hole 23 is disposed on the upper side in the axle bracket 20. For example, the retaining threaded hole 23 is disposed vertically above the eight threaded holes 22.

Then, the retaining bolt 72 is inserted through the retaining through hole 38 toward the retaining threaded hole 23 and screwed into the retaining threaded hole 23. The retaining bolt 72 connects the axle housing 30 and the axle bracket 20 as a unit The retaining bolt 72 connects the axle housing 30 and the axle bracket 20 on the upper side of the axle housing 30 and the axle bracket 20. When the axle housing 30 falls from the axle bracket 20, the axle housing 30 is separated from the axle bracket 20 in the upper portion thereof and falls. That is, a supporting point of the axle bracket 20, which supports the axle housing 30, or a contact point of the projecting portion 36 and the axle bracket 20, exists on the lower side of the axle housing 30, so that the axle housing 30 is separated from the axle bracket 20 in the upper portion thereof and falls due to the rotation of the axle housing 30 around the supporting point. The retaining bolt 72 disposed at a separating point when the axle housing falls, can prevent the axle housing 30 from falling. The projecting portion 36 that is a part of the axle housing 30 is inserted into the first insertion hole 21 and the axle housing 30 is fitted in the axle bracket 20, so that the axle housing 30 is restricted to rotate around the retaining bolt 72.

Figure 6:
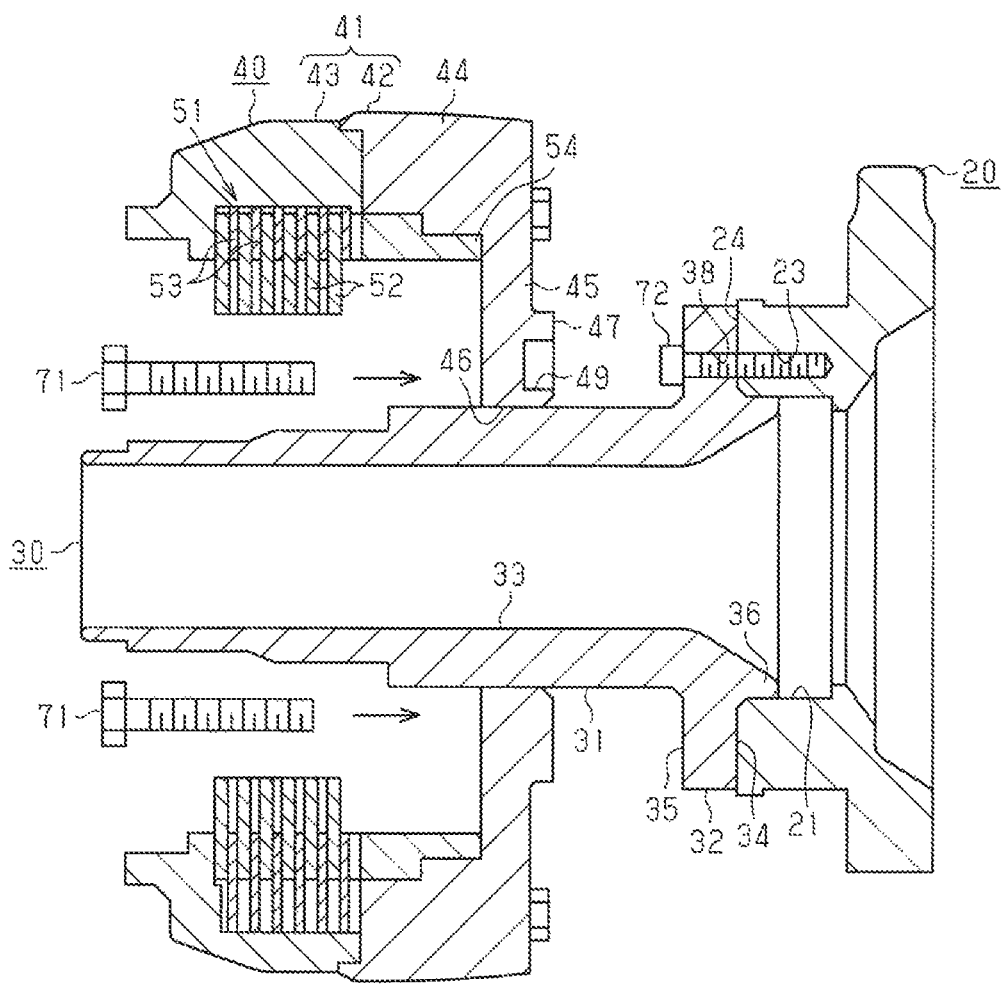
FIG. 6 is a view illustrating a step for assembling a brake housing to the axle bracket and the axle housing.

As shown in FIG. 6, the axle housing 30 is inserted into the axle insertion hole 46 of the brake housing 41. The brake housing 41 is positioned such that the head of the retaining bolt 72 is accommodated in the recess 49. Thus, the threaded holes 22, the first through holes 37, and the second through holes 48 are communicated. The body 31 is inserted into the axle insertion hole 46, so that the brake housing 41 is supported by the axle housing 30. In the state, the co-fastening bolts 71 are inserted through the second through holes 48 and screwed into the threaded holes 22, respectively, so that the axle bracket 20, the axle housing 30, and the brake housing 41 are connected with each other.

Figure 7:
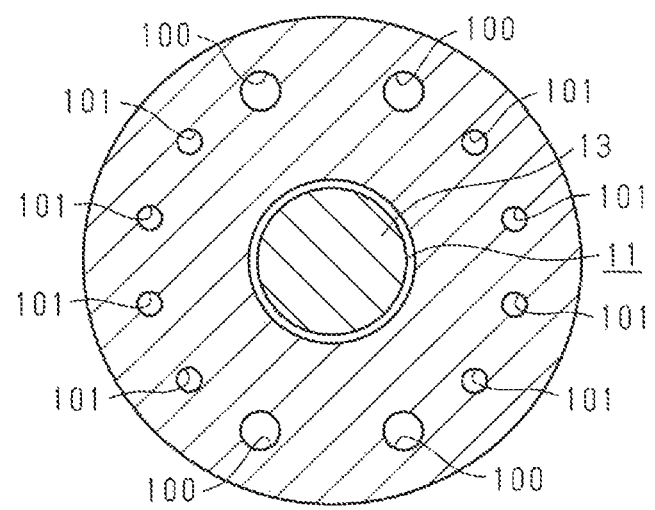
FIG. 7 is a sectional view showing a wall portion of a comparative example.

The following will describe an axle housing supporting structure in the comparative example. If bolts connecting the axle bracket 20 and the axle housing 30, and bolts connecting the axle housing 30 and the brake housing 41 are provided separately, the bolts may interfere with each other, so that the positions of the bolts are restricted. When both bolts are provided separately, the number of the bolts increases. For example, if four bolts are used connecting the axle bracket 20 and the axle housing 30 and eight bolts are used connecting the axle housing 30 and the brake housing 41 are provided, twelve bolts are needed. The head of the bolt connecting the axle bracket 20 and the axle housing 30 interferes with the wall portion 45 of the brake housing 41. Therefore, as shown in FIG. 7, recesses 100 need to be formed in the wall portion 45 of the brake housing 41 in accordance with the number of the bolts connecting the axle bracket 20 and the axle housing 30. Further, through holes 101, through which the bolts connecting the axle housing 30 and the brake housing 41 are respectively inserted, need to be formed in the wall portion 45. Accordingly, the four recesses 100 and the eight through holes 101 need to be disposed such that the four recesses 100 and the eight through holes 101 are not interfered with each other.

On the other hand, in the present embodiment, when the axle bracket 20, the axle housing 30, and the brake housing 41 are connected with each other, the bolts connecting the axle bracket 20 and the axle housing 30 and the bolts connecting the axle housing 30 and the brake housing 41 can be said to be common. Although the recess 49 needs to be provided in the wall portion 45 for preventing the retaining bolt 72 from interfering with the wall portion 45, the number of the bolts is reduced as compared to the case in which the bolts connecting the axle bracket 20 and the axle housing 30 and the bolts connecting the axle housing 30 and the brake housing 41 are provided separately. Therefore, the bolts are hardly restricted to be disposed.

Accordingly, the present embodiment has the following advantageous effects.

(1) The retaining bolt 72 connects the axle housing 30 and the axle bracket 20. When the co-fastening bolts 71 connect the axle bracket 20, the axle housing 30, and the brake housing 41 with each other, the co-fastening bolts 71 may connect the axle housing 30, and the brake housing 41 in a state in which the brake housing 41 is supported by the axle housing 30. Accordingly, the co-fastening bolts 71 can connect the axle bracket 20, the axle housing 30, and the brake housing 41 with each other without any jig. The co-fastening bolt 71 is lighter than a jig for fixing the axle bracket 20, the axle housing 30, and the brake housing 41. Therefore, the co-fastening bolt 71 allows an easier co-fastening operation than a jig. If a jig is used, the jig needs to be removed after a co-fastening operation. However, the retaining bolt 72 need not be removed. Accordingly, in using retaining bolt 72, the working time is small as compared to using a jig and making a jig is not needed. As a result, manufacturing cost can be reduced.

(2) The recess 49 is needed to be provided in the wall portion 45 for preventing the retaining bolt 72 from interfering with the wall portion 45. If the diameter of the retaining bolt 72 becomes larger, the recess 49 needs to become larger. The second through hole 48 needs to be disposed at a position for preventing from interfering with the recess 49. If the recess 49 becomes large, the position of the second through hole 48 is restricted. That is, as the diameter of the retaining bolt 72 becomes larger, the position of the co-fastening bolt 71 is restricted more largely. In the present embodiment, since the retaining bolt 72 is smaller in diameter than the co-fastening bolt 71, the position of the co-fastening bolt 71 is prevented from being restricted.

In a state in which the front axle 10 is mounted in a body of a vehicle, since the weight of the body of the vehicle applies to the co-fastening bolts 71, the co-fastening bolts 71 are required to have strength against the weight of the body of the vehicle. In the present embodiment, since the retaining bolt 72 is used for supporting the weight of the axle housing 30 when assembling the components, the co-fastening bolt 71 may have strength against the weight of the axle housing 30. Therefore, the diameter of the retaining bolt 72 can be small.

(3) The co-fastening bolts 71 are spaced at regular angular intervals, so that the weight applied to each co-fastening bolt 71 can be dispersed and the concentration of the weight applied to a specific co-fastening bolt 71 can be prevented.

As described above, if bolts connecting the axle bracket 20 and the axle housing 30, and bolts connecting the axle housing 30 and the brake housing 41 are provided separately, the two kinds of the bolts may interfere with each other, so that the positions of the bolts are restricted. In the present embodiment, the co-fastening bolts 71 fasten the axle bracket 20, the axle housing 30, and the brake housing 41 together, so that the number of the bolts can be reduced and therefore, the co-fastening bolts 71 can be easily spaced at regular angular intervals.

(4) The projecting portion 36 of the axle housing 30 is fitted in the axle bracket 20. When the co-fastening bolts 71 connect the components, the axle housing 30 can be prevented from rotating around the retaining bolt 72.

The embodiment according to the present disclosure can be modified as follows. The interval of the co-fastening bolts 71 may be changed and may be irregular. The diameter of the retaining bolt 72 may be larger than that of each co-fastening bolt 71.

The number of the co-fastening bolts 71 may be modified. In the case, the number of the threaded hole 22, the first through hole 37, and the second through hole 48 is modified in accordance with the number of the co-fastening bolts 71. A part for connecting the axle housing 30 and the axle bracket 20 through the axle housing 30 and the axle bracket 20, is not limited to bolts, but may be, for example, a knock pin.

The number of the retaining bolt 72 may be modified. In the case, the number of the retaining threaded hole 23, the retaining through hole 38, and the recess 49 is modified in accordance with the number of the retaining bolt 72.

The type of the brake 51 is not limited to a wet-type multiple plate brake, but may be modified. The axle housing 30 may dispense with the projecting portion 36. In an industrial vehicle rear wheel of which is a drive wheel, the rear wheel drive axle may adopt the axle housing supporting structure according to the present embodiment of the present disclosure.

When the co-fastening bolts 71 and the retaining bolt 72 are screwed, nuts may be used instead of the threaded holes 22 and the retaining threaded hole 23. Threaded holes and a retaining threaded hole that are formed through the axle bracket 20 in the direction of the axis Z, may be used instead of the threaded holes 22 and the retaining threaded hole 23

What is claimed is:

1. An axle housing supporting, structure comprising:
    an axle housing;
    a brake housing;
    an axle bracket for supporting the axle housing and the brake housing;
    a connecting member inserted in the axle housing and the axle bracket, to connect the axle housing and the axle bracket for preventing the axle housing from falling from the axle bracket; and
    at least one co-fastening bolt fastening the axle bracket, the brake housing, and the axle housing together, wherein
    the connecting member is a bolt that is smaller in diameter than the at least one co-fastening bolt.

2. The axle housing supporting structure according to claim 1,
    wherein the at least one co-fastening bolt comprises a plurality of co-fastening bolts, and
    wherein the co-fastening bolts are spaced at regular intervals in a circumferential direction of an axle shaft accommodated in the axle housing.

3. The axle housing supporting structure according to claim 1,
    wherein the axle housing has a fitting portion that is fitted in the axle bracket.

* * * * *